(12) United States Patent
Piccardi et al.

(10) Patent No.: US 11,117,778 B2
(45) Date of Patent: Sep. 14, 2021

(54) QUALITY CONTROL STATION WITH CAMERA CALIBRATION SYSTEM FOR SHEET ELEMENT PROCESSING MACHINE

(71) Applicant: BOBST MEX SA, Mex (CH)

(72) Inventors: Lorenzo Piccardi, Epalinges (CH); Mauro Truscello, Pully (CH); Pablo Antolinez, Ferney Voltaire (FR)

(73) Assignee: BOBST MEX SA

( * ) Notice: Subject to any disclaimer, the term of this patent is extended or adjusted under 35 U.S.C. 154(b) by 65 days.

(21) Appl. No.: 16/099,745

(22) PCT Filed: May 9, 2017

(86) PCT No.: PCT/EP2017/025114
§ 371 (c)(1),
(2) Date: Nov. 8, 2018

(87) PCT Pub. No.: WO2017/198343
PCT Pub. Date: Nov. 23, 2017

(65) Prior Publication Data
US 2019/0135572 A1   May 9, 2019

(30) Foreign Application Priority Data

May 20, 2016   (DE) ...................... 20 2016 102 705.5

(51) Int. Cl.
*B65H 43/04*   (2006.01)
*B41F 33/00*   (2006.01)
(Continued)

(52) U.S. Cl.
CPC .......... *B65H 43/04* (2013.01); *B41F 33/0036* (2013.01); *B41F 33/02* (2013.01);
(Continued)

(58) Field of Classification Search
None
See application file for complete search history.

(56) References Cited

U.S. PATENT DOCUMENTS 5,107,206 A * 4/1992 Yanagi ............... G01R 31/2806
324/750.22
5,457,539 A * 10/1995 Sturm ..................... G01D 18/00
250/559.01
(Continued)

FOREIGN PATENT DOCUMENTS

EP   0 734 863 A1   10/1996
EP   0 749 833 A2   12/1996

OTHER PUBLICATIONS

International Search Report dated Jul. 31, 2017 in corresponding PCT International Application No. PCT/EP2017/025114.
(Continued)

*Primary Examiner* — John R Wallace
(74) *Attorney, Agent, or Firm* — Ostrolenk Faber LLP

(57) ABSTRACT

A quality control station (2) for a sheet element processing machine, the station having at least one camera (6) arranged for capturing images of sheet elements (4) transported through the quality control station (2), and further having a camera calibration system (10). The camera calibration system (10) having a target holder (12) for holding an optical target (14), and a drive (15) for the target holder (12). The drive (15) is adapted for displacing the target holder (12) between a rest position, in which it is outside of the viewing area (7) of the camera (6), and a calibration position in which it is arranged in the viewing area (7) of the camera (6).

10 Claims, 3 Drawing Sheets

(51) Int. Cl.
*B41F 33/02* (2006.01)
*G01N 21/93* (2006.01)
*B65H 7/14* (2006.01)
*G01N 21/89* (2006.01)

(52) U.S. Cl.
CPC ............... *B65H 7/14* (2013.01); *G01N 21/93* (2013.01); *B65H 2301/445* (2013.01); *B65H 2301/542* (2013.01); *B65H 2551/29* (2013.01); *B65H 2553/42* (2013.01); *B65H 2557/61* (2013.01); *B65H 2701/176* (2013.01); *B65H 2801/21* (2013.01); *G01N 2021/8917* (2013.01)

(56) References Cited

U.S. PATENT DOCUMENTS

| | | | | |
|---|---|---|---|---|
| 2001/0043245 | A1* | 11/2001 | Endo | B41J 2/16579 347/19 |
| 2013/0050771 | A1* | 2/2013 | Deamer | H04N 1/125 358/448 |
| 2014/0146164 | A1* | 5/2014 | Bajema | G01N 21/93 348/89 |
| 2014/0375793 | A1* | 12/2014 | Harada | G03F 7/70633 348/80 |

OTHER PUBLICATIONS

Written Opinion dated Jul. 31, 2017 in corresponding PCT International Application No. PCT/EP2017/025114.

\* cited by examiner

QUALITY CONTROL STATION WITH CAMERA CALIBRATION SYSTEM FOR SHEET ELEMENT PROCESSING MACHINE

CROSS-REFERENCE TO RELATED APPLICATIONS

The present application is a 35 U.S.C. §§ 371 national phase conversion of PCT/EP2017/025114, filed May 9, 2017, which claims priority of German Patent Application No. 20 2016 102 705.5, filed May 20, 2016, the contents of which are incorporated by reference herein. The PCT International Application was published in the English language.

TECHNICAL BACKGROUND

The invention relates to a quality control station for a sheet element processing machine.

The term "sheet element processing machine" is here intended to comprise any machine which is being used for processing sheet elements such as paper, cardboard or similar materials, in particular printing machines, coating machines, laminating machines and converting machines (for example cutting, stamping, folding and/or gluing machines).

It is generally known to control the quality of sheet elements by means of a camera. Generally speaking, the camera captures images of the sheet elements being transported through the quality control station, and the captured images are analyzed with respect to many different parameters so as to obtain information on whether or not the sheet elements fulfill certain criteria.

It is essential for proper quality control that the camera capturing the images is properly calibrated. Should the camera not be calibrated properly, there is a risk that sheet elements are being rejected even though their quality fulfills the criteria, or are accepted even though they should have been rejected.

In the prior art, calibration of the camera is quite burdensome, as the entire sheet element processing machine has to be stopped, and a print carrying calibration marks has to be arranged in the viewing area of the camera. Then, the camera is calibrated, and the print is removed after calibration of the camera so as to allow the operation of the sheet element processing machine to continue.

SUMMARY OF THE INVENTION

The object of the invention is to allow an easy and quick calibration of the camera used in the quality control station.

In order to achieve this object, the invention provides a quality control station for a sheet element processing machine, having at least one camera arranged for capturing images of sheet elements transported through the quality control station and further having a camera calibration system. The camera calibration system has a target holder configured for holding an optical target, and a drive for the target holder. The drive is configured for displacing the target holder between a rest position in which it is outside of the viewing area of the camera and a calibration position in which it is arranged in the viewing area of the camera. The drive allows placing the optical target in the viewing area of the camera when a calibration is to be made, without requiring much effort. It is sufficient to place the optical target in the target holder and to then move the target holder into the viewing area of the camera. It is not necessary to interfere with the setup of the sheet element processing machine or the quality control station as the calibration system is an integrated part of the quality control station. At the same time, it does not affect the normal operation of the quality control station as the target holder, in the rest position, is arranged outside the viewing area of the camera.

The term "viewing area of the camera" here refers to the area in which images of the sheet elements transported through the quality control station are being captured by the camera(s) for the purpose of quality control. This term does not refer to the theoretical (potentially wider) angle under which images could be captured.

According to a preferred embodiment of the invention, the drive includes a guide element extending transversely to the direction of transportation of the sheet elements and across the entire width of the passage along which the sheet elements are being transported. This drive element allows placing the target holder and therewith the optical target at any desired point along the width of the quality control station, thereby allowing a calibration of the camera at different points of the viewing area.

The guide element preferably is a pneumatic or hydraulic rod on which a movable driven element is arranged. This construction is also known as rodless pneumatic or hydraulic cylinder and requires very little installation space which is advantageous as not much space is available for integrating the calibration system into the quality control station.

According to an embodiment, the drive is arranged upstream or downstream of the viewing area of the camera. This makes it easier to guarantee that the calibration system does not protrude into the passage of light which is being generated by a light source and directed onto the sheet elements in the viewing area of the camera.

Preferably, the target holder is connected to the drive system by means of a thin carrier arm. The thin carrier arm allows placing the drive at a certain distance from the area where the target holder necessarily has to be when a camera calibration is being made.

According to a preferred embodiment, the drive is arranged above the path of transportation of the sheet elements while the target holder is arranged below the path of transportation of the sheet elements. This design allows using a small interruption in a table or similar element on which the sheet elements are being transported so that it is possible to arrange the optical target basically on the same level as the sheet elements which are being transported through the quality control station. Nevertheless, the drive is integrated into the quality control station above the table at which the sheet elements are being advanced so that no modification to the table is necessary.

Preferably, the target holder has a laterally arranged introduction opening for an optical target. The introduction opening is arranged laterally outside a machine frame when the target holder is in the rest position. An operator thus can place an optical target in the target holder during normal operation of the quality control station, thereby minimizing the time for which the operation of the quality control station is to be interrupted for calibrating the camera.

Preferably, fixation means are provided for defining the position of the target holder in the rest position, the fixation means preferably comprising a spring and/or a fixation pin. The fixation means allow eliminating clearances which are the result of tolerances and a potential sag of the drive over the width of the quality control station.

According to a preferred embodiment of the invention, a position control is being used for providing information on the position of the target holder along the drive. A position information is advantageous in the process of calibrating the camera, for example in a situation in which two adjacent cameras are being used which each capture images over only a portion of the width of the viewing area.

The invention will now be described with reference to a preferred embodiment which is shown in the enclosed drawings. In the drawings,

DESCRIPTION OF AN EMBODIMENT

Figure 1:
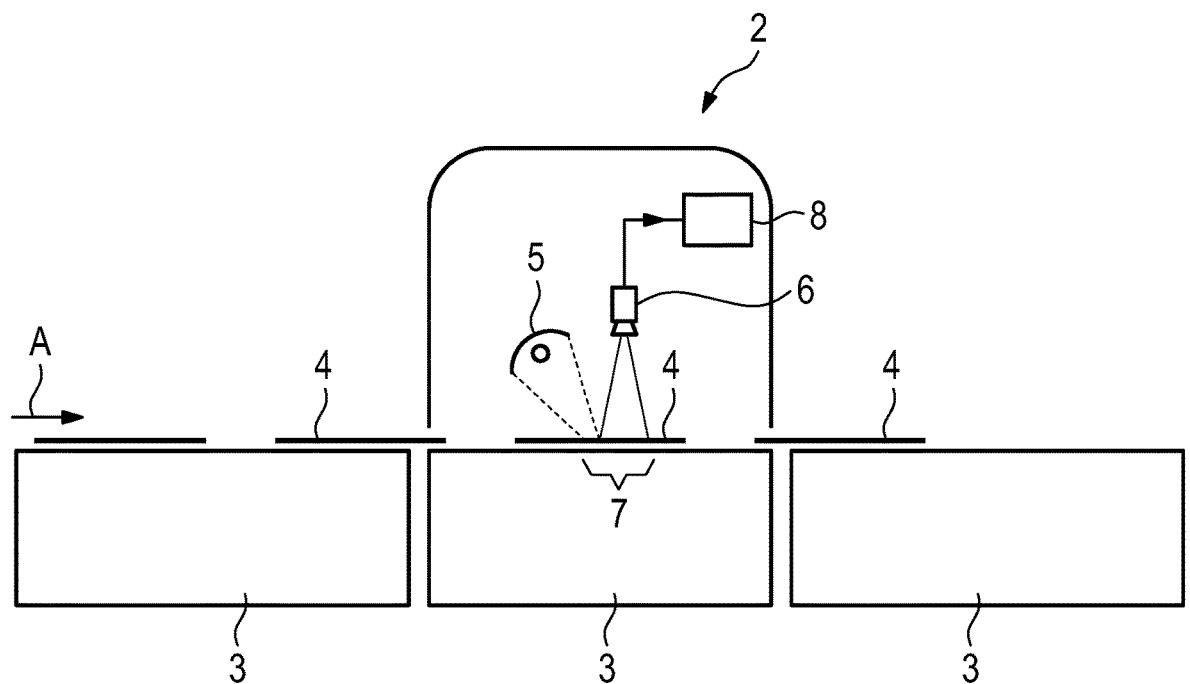
FIG. 1 schematically shows a quality control station employed in a sheet element processing machine.

In FIG. 1, a quality control station 2 is schematically shown, which is employed in a sheet element processing machine of which conveyor tables 3 are shown. The sheet element processing machine can process sheet elements 4 which are being transported in the direction of arrow A. The sheet elements 4 can be sheets of paper, cardboard or a similar material, or they can be in the form of a longer web. The sheet element processing machine can be a printing machine, a stamping machine, a laminating machine, a folding machine, a gluing machine, etc.

The quality control station 2 is used for controlling the quality of the sheet elements 4. Generally stated, a light source 5 is used which directs light onto a surface of a sheet element which is currently being inspected.

A camera 6 is used in the quality control station 2 for capturing an image of the sheet element 4 currently being advanced through the quality control station. More precisely, camera 6 captures an image in a viewing area 7 which is a very narrow area extending over the entire width of the sheet elements in a direction perpendicular to the direction A along which the sheet elements are being advanced through the quality control station 2.

It is also possible to use more than one light source 5, and it is also possible to use more than one camera 6 in the quality control station 2. In particular, it is possible to use two cameras which are arranged adjacent each other, with a first camera capturing an image of the left half of the sheet and the second camera capturing an image of the right half of the sheet.

The image captured by camera 6 is supplied to a control 8 where it is being compared with stored reference images and/or analyzed in various respects. Control 8 then makes a determination whether or not the quality of the respective sheet element 4 satisfies predetermined criteria.

In order to make sure that the images captured by camera 6 correspond to a certain reference, camera 6 is being calibrated from time to time. To this end, a calibration system 10 (see FIGS. 2 to 4) is provided within quality control station 2.

Figure 3:
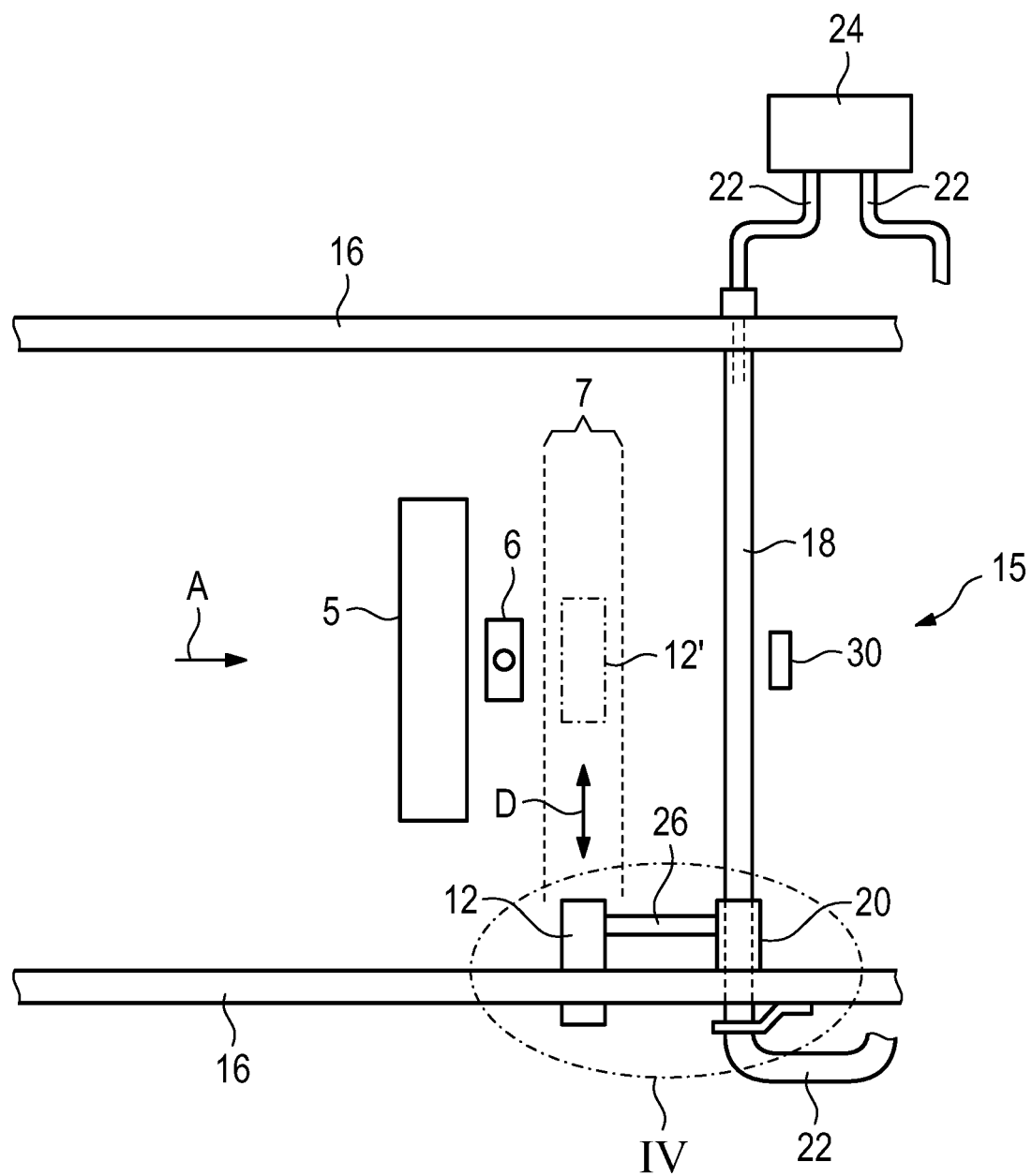
FIG. 3 schematically shows a top view of the quality control station of FIG. 2.

Camera calibration system 10 comprises a target holder 12 in which an optical target 14 can be arranged, and a drive 15 with which target holder 12 can be displaced between a rest position (shown in FIGS. 3 and 4) and a calibration position 12' shown in FIG. 3 with broken lines.

Drive 15 is configured for displacing target holder 12 in a direction D perpendicular to the direction A across the width of the quality control station. Generally, the target holder 12 can be displaced back and forth between the two sides of a machine frame 16 of the quality control station.

In the embodiment shown, drive 15 comprises a guide element 18 which is here in the form of a pneumatic or hydraulic rod on which a moveable driven element 20 is arranged. Such combination of driven element 20 and pneumatic or hydraulic rod is also known as "rodless pneumatic or hydraulic piston" as it does not use a rod which extends in conventional hydraulic or pneumatic actuators from the piston through one of the end plates of the hydraulic or pneumatic cylinder.

Drive 15 further comprises hoses 22 and switching valves 24 for supplying hydraulic or pneumatic pressure at the desired level to guide element 18.

Target holder 12 is connected to driven element 20 by means of a thin carrier arm 26. Carrier arm 26 allows arranging guide element 18 at a certain distance (viewed in a direction parallel to direction A along which the sheet elements 4 are being advanced) from target holder 12. In the embodiment shown in the drawings, guide element 18 is arranged downstream of viewing area 7. Depending on constructional constraints, it is also possible to arrange the entire drive 15 upstream of viewing area 7.

Figure 2:
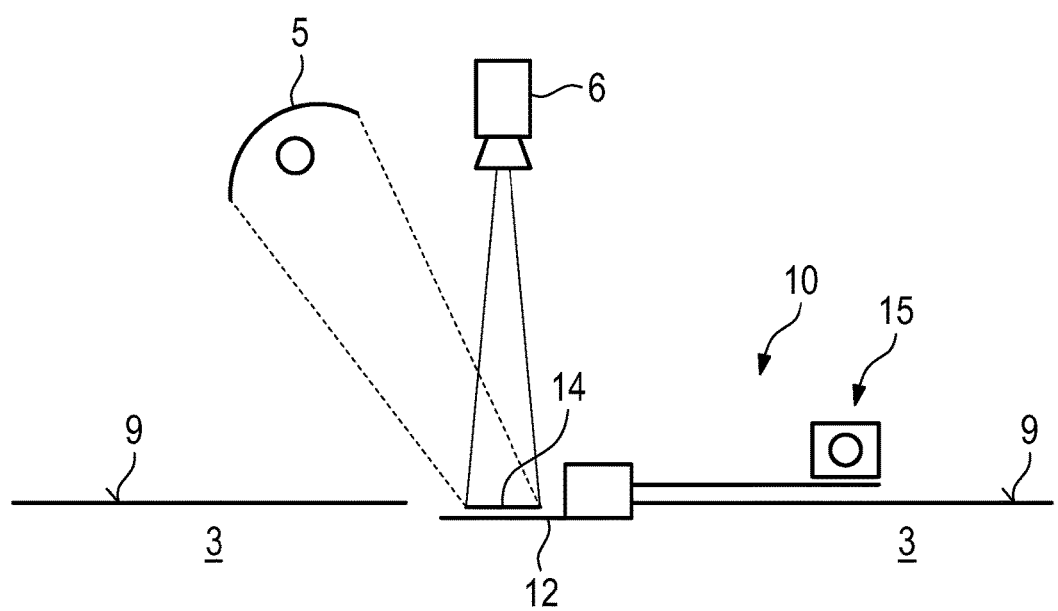
FIG. 2 schematically shows in a side view a quality control station according to the invention using a camera calibration system.

Furthermore, it can be seen in particular in FIG. 2 that drive 15 is arranged above the surface along which sheet elements 4 are being advanced (here schematically indicated as the top surface 9 of conveyor table 3) while target holder 12 is arranged beneath surface 9. This makes it possible to arrange optical target 14 at the level of surface 9 while at the same time arranging drive 15 within quality control station 2 and above conveyor table 3.

Target holder 12 can be considered as a flat tray in which an optical target can be arranged. Advantageously, it is possible to fix the optical target to target holder 12. This is exemplified in FIG. 4 with springs 28.

Figure 4:
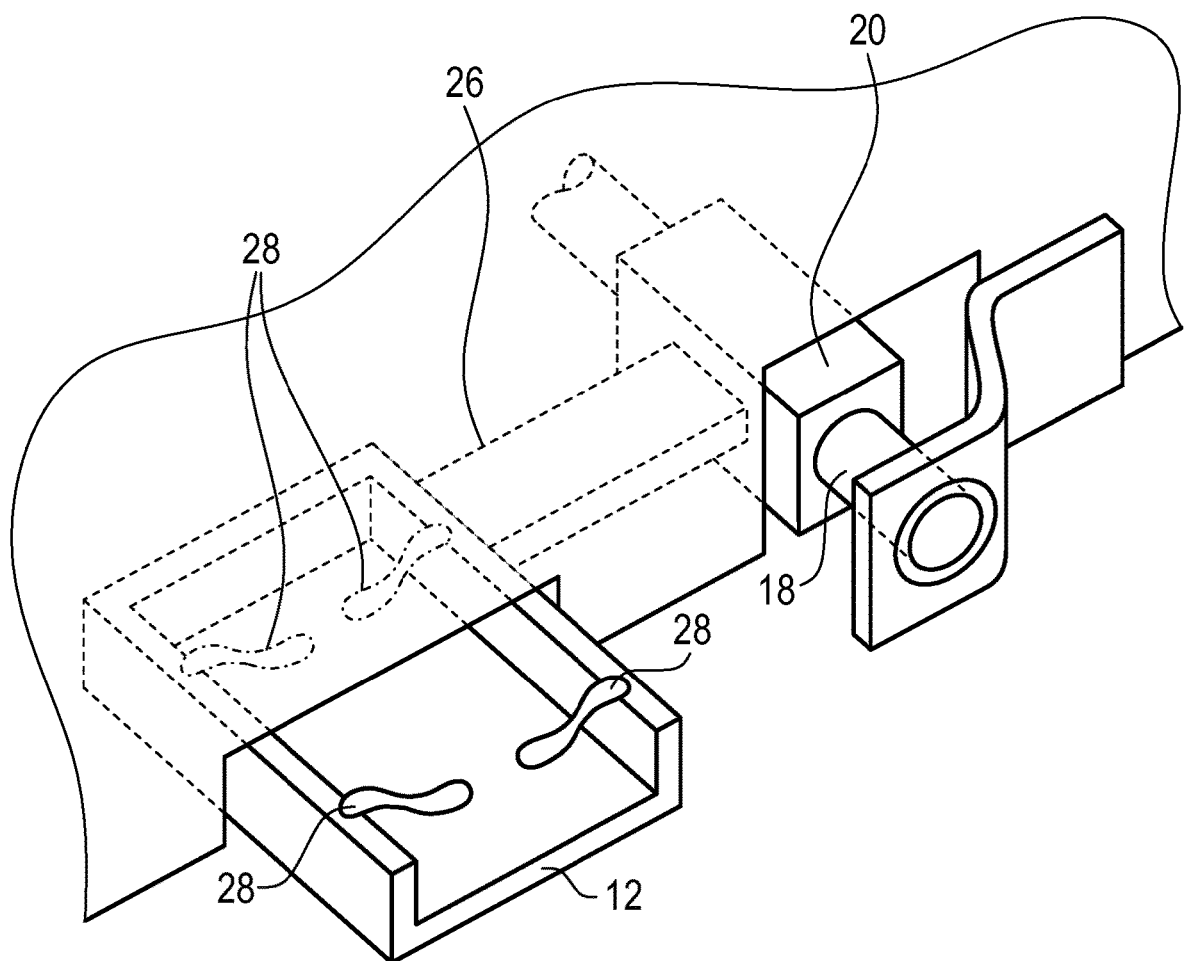
FIG. 4 schematically shows in a perspective view the portion identified with IV in FIG. 3.

As can be seen in FIGS. 3 and 4, target holder 12 partially extends outside machine frame 16 when being in the rest position. This allows an operator to place an optical target in the target holder very conveniently.

For calibrating camera 6, an appropriate optical target 14 is placed in target holder 12, and drive 15 is being used for moving target holder 12 together with target 14 in the direction of arrow D into the viewing area 7 of camera 6. There, the appropriate calibration is being made, and after the calibration is completed, target holder 12 is transferred back into the rest position outside of the viewing area.

A calibration of camera 6 can be made in different respect, and different types of optical targets are being used for making the calibration. The calibration of camera 6 can relate to color, focus, geometry, white balance and potentially other parameters, and the optical target 14 can either be a target which is dedicated to a single aspect only, or it can comprise marks, patterns and/or imprints which allow a simultaneous calibration with respect to two or more aspects.

A position control can be associated with drive 15. The position control provides information on the position of driven element 20 and/or target holder 12 either continuously along the possible travel between the machine frames 16 or specifically at certain locations which are relevant. As an example, a position sensor 30 is shown in FIG. 3 in a position which corresponds to target holder 12 being arranged in the middle between the two sides of machine frame 16. Such central position can be helpful for calibrating a single camera 6. In case two cameras are being used, two position sensors 30 might be advantageous.

As an alternative to the pneumatic or hydraulic rod used in the described embodiment, other structure can be used for moving the target holder 12 into the viewing area of the camera and out of it again.

As an example, the driven element 20 can be arranged on a guide rod and connected to a belt drive. It is also possible to arrange the driven element on a spindle (an endless screw) which extends over the width of the machine and is driven by an electric motor. It is even possible to move the target holder manually into and out of the viewing area of the camera.

The invention claimed is:

1. A quality control station for a sheet element processing machine processing sheet elements along a path of transportation, the quality control station comprising:
    at least one camera arranged for capturing images of sheet elements transported through the quality control station, the camera having a viewing area; and
    a camera calibration system comprising:
    a target holder configured for holding an optical target and the target holder is positioned below the path of transportation;
    a drive for the target holder, the drive being positioned above the path of transportation and configured for displacing the target holder between a rest position, in which the target holder is outside of the viewing area of the camera, and a calibration position in which the target holder is arranged in the viewing area of the camera; and
    a carrier arm connecting the target holder to the drive and moving the target holder in accordance with movement of the drive.

2. The quality control station of claim 1, wherein the drive includes a guide element extending transversely to the direction of transportation of the sheet elements and across the entire width of a passage along which the sheet elements are being transported.

3. The quality control station of claim 2, wherein the guide element is a pneumatic or hydraulic rod on which a moveable driven element is arranged.

4. The quality control station of claim 2, wherein the guide element is a screw driven by a motor, on which a moveable driven element is arranged.

5. The quality control station of claim 2, further comprising a belt associated with the guide element and located and configured for advancing a driven element along the guide element.

6. The quality control station of claim 1, wherein the drive is arranged either upstream or downstream of the viewing area of the camera.

7. The quality control station of claim 1, wherein the target holder has a laterally arranged and located introduction opening for receiving an optical target, the introduction opening being arranged and located laterally outside a machine frame when the target holder is in the rest position.

8. The quality control station of claim 1, further comprising a fixation device defining a position of the target holder in the rest position.

9. The quality control station of claim 8, wherein the fixation device comprises a spring, or a fixation pin, or a spring and a fixation pin.

10. The quality control system of claim 1, further comprising a position control configured for providing information on the position of the target holder along the drive.

* * * * *